(12) United States Patent
Gupta et al.

(10) Patent No.: US 10,935,849 B2
(45) Date of Patent: *Mar. 2, 2021

(54) ELECTRONIC DEVICE DISPLAYS WITH LASER-WELDED EDGES (71) Applicant: Apple Inc., Cupertino, CA (US)

(72) Inventors: Nathan K. Gupta, San Francisco, CA (US); Atanas V. Gagov, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,193

(22) Filed: Aug. 8, 2019

(65) Prior Publication Data

US 2019/0361274 A1 Nov. 28, 2019

Related U.S. Application Data (63) Continuation of application No. 15/197,002, filed on Jun. 29, 2016, now Pat. No. 10,401,689.

(60) Provisional application No. 62/276,736, filed on Jan. 8, 2016.

(51) Int. Cl.
G02F 1/1339 (2006.01)
G02F 1/1335 (2006.01)

(52) U.S. Cl.
CPC ...... *G02F 1/1339* (2013.01); *G02F 1/133514* (2013.01); *G02F 2201/503* (2013.01)

(58) Field of Classification Search
CPC ....... G02F 1/1333; G02F 2001/133325; G02F 1/1341; G02F 1/1339; G02F 1/0107; G02F 1/161; G02F 2201/503; G02F 1/1679; H01L 51/514; H01L 51/5246
See application file for complete search history.

(56) References Cited

U.S. PATENT DOCUMENTS

| 4,640,583 A | 2/1987 | Hoshikawa et al. |
| 9,242,310 B2 | 1/2016 | Kim et al. |
| 2003/0137630 A1 | 7/2003 | Niiya |
| 2004/0004436 A1 | 1/2004 | Yoneda |
| 2007/0029623 A1 | 2/2007 | Liu et al. |

(Continued)

FOREIGN PATENT DOCUMENTS

| JP | 2010060993 A | * | 3/2010 |
| JP | 2010060993 A | | 3/2010 |
| WO | 2016032885 | | 3/2016 |

*Primary Examiner* — Jia X Pan (74) *Attorney, Agent, or Firm* — Treyz Law Group, P.C.; G. Victor Treyz; Matthew R. Williams (57) ABSTRACT An electronic device may be provided with a display having substrate layers such as a color filter layer, thin-film transistor layer, or other display layers. An array of pixels may be formed from thin-film circuitry on a display layer. A color filter layer may be formed from an array of color filter elements on a display layer. The color filter elements may provide the array of pixels with the ability to display color images. In a liquid crystal display configuration, a liquid crystal layer may be interposed between the substrate layers. A ring of sealant may surround the liquid crystal layer and may be interposed between the substrate layers. The display may have a periphery. The substrate layers may be welded with a glass weld such as a laser glass weld or other weld on an edge surface of the substrate layers running along the periphery.

9 Claims, 6 Drawing Sheets (56) References Cited

U.S. PATENT DOCUMENTS

| | | |
|---|---|---|
| 2007/0164672 A1 | 7/2007 | Omura et al. |
| 2007/0291216 A1 | 12/2007 | Chan et al. |
| 2010/0045181 A1 | 2/2010 | Oh et al. |
| 2011/0012873 A1* | 1/2011 | Prest ............... H01L 51/5237 345/204 |
| 2011/0194063 A1* | 8/2011 | Lee ................. G02F 1/1333 349/153 |
| 2011/0249376 A1* | 10/2011 | Wu .................. H01L 51/5246 361/679.01 |
| 2012/0044450 A1 | 2/2012 | Kurosaki et al. |
| 2012/0075823 A1 | 3/2012 | Park et al. |
| 2012/0080671 A1 | 4/2012 | Niboshi et al. |
| 2012/0235557 A1* | 9/2012 | Lee .................. H01L 51/5246 313/495 |
| 2012/0287026 A1 | 11/2012 | Masuda et al. |
| 2012/0326131 A1 | 12/2012 | Han |
| 2013/0134397 A1 | 5/2013 | Yamazaki et al. |
| 2013/0286480 A1 | 10/2013 | Hirota |
| 2014/0063432 A1 | 3/2014 | Yamazaki et al. |
| 2014/0125935 A1 | 5/2014 | Nakamura et al. |
| 2014/0168916 A1 | 6/2014 | Nagaoka et al. |
| 2015/0027168 A1 | 1/2015 | Dabich et al. |
| 2015/0236309 A1 | 8/2015 | Rohatgi |

* cited by examiner

*FIG. 10*

ELECTRONIC DEVICE DISPLAYS WITH LASER-WELDED EDGES

This application is a continuation of U.S. patent application Ser. No. 15/197,002, filed Jun. 29, 2016, which claims the benefit of provisional patent application No. 62/276,736, filed Jan. 8, 2016, both of which are hereby incorporated by reference herein in their entireties.

FIELD

This relates generally to electronic devices and, more particularly, to electronic devices with displays.

BACKGROUND

Electronic devices often contain displays. For example, laptop computers, cellular telephones, tablet computers, and desktop computers may contain displays. Displays in these devices may contain substrates formed from transparent materials such as glass.

It can be challenging to design a robust display for an electronic device. Electronic devices and displays in electronic devices may be prone to damage when dropped or subjected to other impact events. If care is not taken, display layers may separate from each other and render a display unusable. Protective structures such as thick plastic housings may help protect fragile display structures, but may be bulky and unattractive.

SUMMARY

An electronic device may be provided with a display having substrate layers such as a color filter layer, thin-film transistor layer, or other display layers. Display layers may be formed from rigid transparent layers of material such as glass, sapphire or other crystalline material, ceramic, rigid plastic, or may be formed from other display layer materials.

An array of pixels may be formed from thin-film circuitry on a display layer. The pixels may include light-emitting diodes such as organic light-emitting diodes or may be liquid crystal pixels in a liquid crystal display. In a liquid crystal display configuration, a liquid crystal layer may be interposed between the substrate layers of the display. A ring of sealant may surround the liquid crystal layer and may be interposed between the substrate layers.

The display may have a periphery. For example, the display may have a rectangular periphery with four corners or may have other suitable shapes. The substrate layers may be welded together with a glass weld such as a laser glass weld or other weld formed on an edge surface of the substrate layers running along the periphery. The weld may surround the array of pixels in the display, may run along only corner portions of the display, or may have other patterns such as a series of disjoint weld segments. Segmented or continuous weld portions may extend around the corners of a display.

DETAILED DESCRIPTION

An electronic device may have a display and other electronic components. The display and other component may be mounted in a housing. The display may include one or more layers. The layers in a display may include, for example, glass substrates or other substrates.

In some configurations, the layers of a display may be transparent. For example, a display may have an array of pixels and may have one or more transparent substrate layers through which light associated with the pixels may pass as images are viewed by a user. Display layers may be formed from glass, ceramic, sapphire or other crystalline materials, plastic, or other suitable materials. The layers in a display may be formed from rigid materials and/or may include flexible materials. Configurations in which an electronic device is provided with a display having rigid display layers such as transparent glass substrate layers may sometimes be described herein as an example.

Adhesive joints between glass layers and display layers may be subject to delamination when device 10 is dropped or otherwise subjected to stress. To help hold the layers of display 14 together, two or more of the display layers may be joined using techniques such as laser welding. In a display with a pair of glass display substrate layers, for example, the peripheral edge of the display glass substrate layers may be welded using a laser glass weld. Joining glass layers or other display layers in this way may strengthen the display and thereby help prevent damage to the display when the display is subjected to stress.

Figure 1:
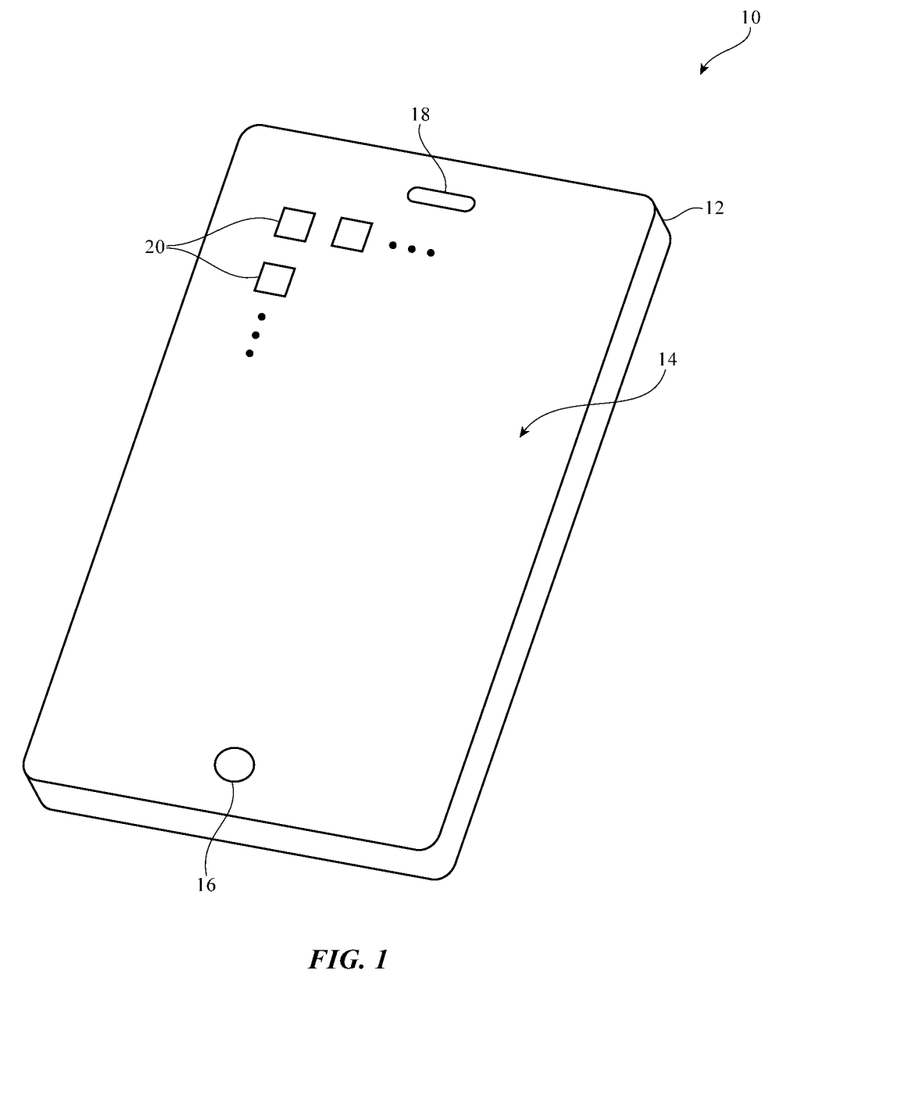
FIG. 1 is a perspective view of an illustrative electronic device in accordance with an embodiment.

FIG. 1 is a perspective view of an illustrative electronic device of the type that may include a display with welded layers. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes display 14. Display 14 may have an array of pixels 20. Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Pixels 20 in display 14 may be formed from an array of liquid crystal display (LCD) components, an array of electrophoretic pixels, an array of plasma display pixels, an array of organic light-emitting diode pixels, an array of electrowetting pixels, or pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports, holes for buttons, and other structures. If desired, the outermost layer of display 14 may be a color filter layer, a thin-film transistor layer, a layer that includes both color filter layer structures and thin-film transistor layer structures, or may be another layer of display 14 that does not serve solely as a protective layer. In this type of configuration, the outer display cover layer may be omitted and the protective functions of the display cover layer may be provided by the outermost layer of display 14 while the outermost layer also performs functions such as serving as a substrate for an array of color filter elements, thin-film transistor pixel circuits, touch sensor structures, and/or other structures.

Figure 2:
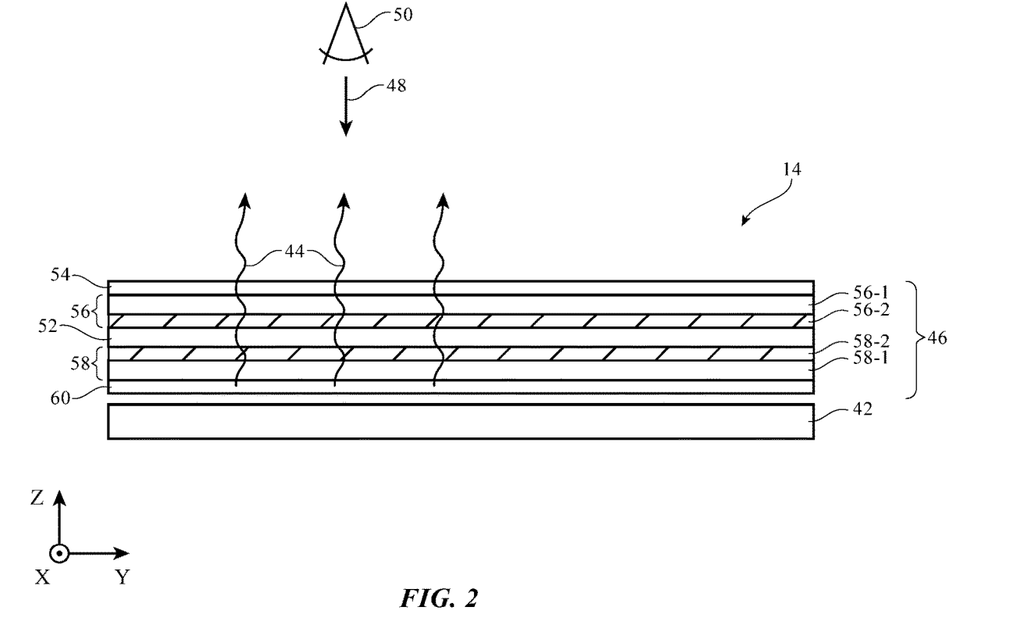
FIG. 2 is a cross-sectional side view of an illustrative display such as a liquid crystal display in accordance with an embodiment.

A cross-sectional side view of an illustrative configuration for display 14 of device 10 is shown in FIG. 2. As shown in FIG. 2, display 14 may include backlight structures such as backlight unit 42 for producing backlight illumination (backlight) 44. During operation, backlight 44 travels outwards (vertically upwards in dimension Z in the orientation of FIG. 2) and passes through pixel structures in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 58 and 56 may be interposed between lower polarizer layer 60 and upper polarizer layer 54.

Layers 58 and 56 may be formed from transparent substrate layers such as clear layers of glass, plastic, sapphire or other crystalline materials, transparent ceramic materials, or other layers of material. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixels based on thin-film transistors and associated electrodes (pixel electrodes) for applying electric fields to liquid crystal layer 52 and thereby displaying images on display 14. As shown in FIG. 2, layer 58 may, for example, have a transparent substrate layer (e.g., a glass layer, etc.) such as substrate layer 58-1. A layer of thin-film circuitry such as layer 58-2 may be formed on substrate layer 58-1. Layer 56 may be a color filter layer that includes an array of color filter elements for providing display 14 with the ability to display color images. As shown in FIG. 2, layer 56 may, for example, have a transparent substrate layer (e.g., a glass layer, etc.) such as substrate layer 56-1 that is covered with an array of color filter elements such as color filter element layer 56-2. Layer 56-2 may include a black matrix with openings for respective pixels, colored polymer elements or other color filter elements in each of the openings, and a clear overcoat layer or may contain other color filter element structures.

If desired, layer 58 may be a color filter layer and layer 56 may be a thin-film transistor layer. Configurations in which color filter elements are combined with thin-film transistor structures on a common substrate layer may also be used. For example, a selected one of layers 56 and 58 may contain thin-film transistor circuitry with electrodes and transistors for controlling electric fields applied to portions of liquid crystal layer 52 and may contain color filter elements, whereas the remaining layer of layers 56 and 58 may be a clear glass layer or other clear substrate. Configurations in which touch sensor structures are formed on layer 56, layer 58, and/or other layers in display 14 may also be used. If desired, an electrostatic discharge protection layer such as a blanket film of indium tin oxide or other transparent conductive material may cover the outer surface of display 14. Functional layers such as antireflection coatings, antiscratch coatings, antismudge coatings, and/or other coating layers may be formed the outer surface of display 14 and/or other surfaces within the layers of display 14.

During operation of display 14 in device 10, control circuitry (e.g., one or more integrated circuits on a printed circuit) may be used to generate information to be displayed on display 14 (e.g., display data). The information to be displayed on display 14 may be conveyed to a display driver integrated circuit or other display driver circuitry. The display driver circuitry may supply data signals to the array of pixels in display 14 using data lines and may supply control signals (gate line signals) to the array of pixels in display 14 on control lines (gate lines). In response, the array of pixels in display 14 may display images on display 14.

Backlight structures 42, which may sometimes be referred to as a backlight unit or backlight, may include a light guide layer that is edge lit with light-emitting diodes, a two-dimensional array of light-emitting diodes, or other light source. Light 44 that is produced by backlight structures may propagate outwardly (upwardly in the orientation of FIG. 2) through layers 46 and may serve as backlight 44 for display 14.

Figure 3:
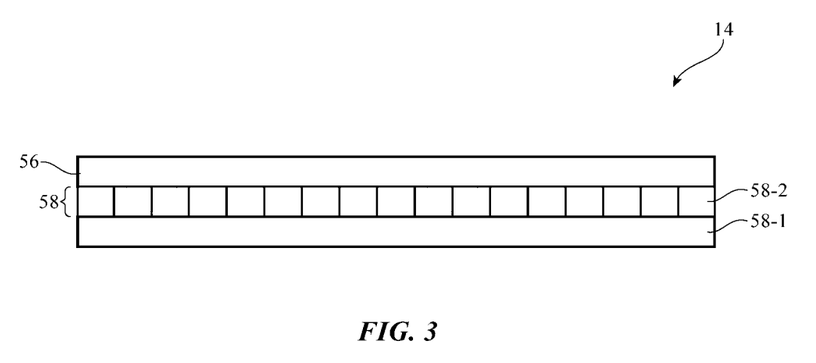
FIG. 3 is a cross-sectional side view of an illustrative display such as an organic light-emitting diode display in accordance with an embodiment.

If desired, display 14 may have an array of light-emitting diodes. Consider, as an example, display 14 of FIG. 3. As shown in FIG. 3, display 14 may have layers 56 and 58. Layer 58 may include a substrate layer such as layer 58-1. Layer 58-1 may be a layer of glass, sapphire or other crystalline material, ceramic, plastic, or other substrate layer. Layer 58-2 may include thin-film transistor circuitry such as thin-film organic light-emitting diodes (e.g., an array pixels each of which contains a respective organic light-emitting diode), pixel control circuits formed from thin-film transistors and thin-film capacitors, and/or other thin-film structures, may contain an array of crystalline semiconductor light-emitting diode dies, may contain an array of quantum dot light-emitting diodes, or may contain other light-emitting diode structures for forming an array of pixels on layer 58-1. Layer 56 may be a protective clear cover layer, a color filter layer, or other display layer. As with display 14 of FIG. 2, the outer surface of layer 56 and/or other display layer surfaces in display 14 of FIG. 3 may be covered with functional layers such as antiscratch coatings, antismudge layers, antireflection layers, electrostatic discharge protection layers, touch sensor structures, etc.

Figure 4:
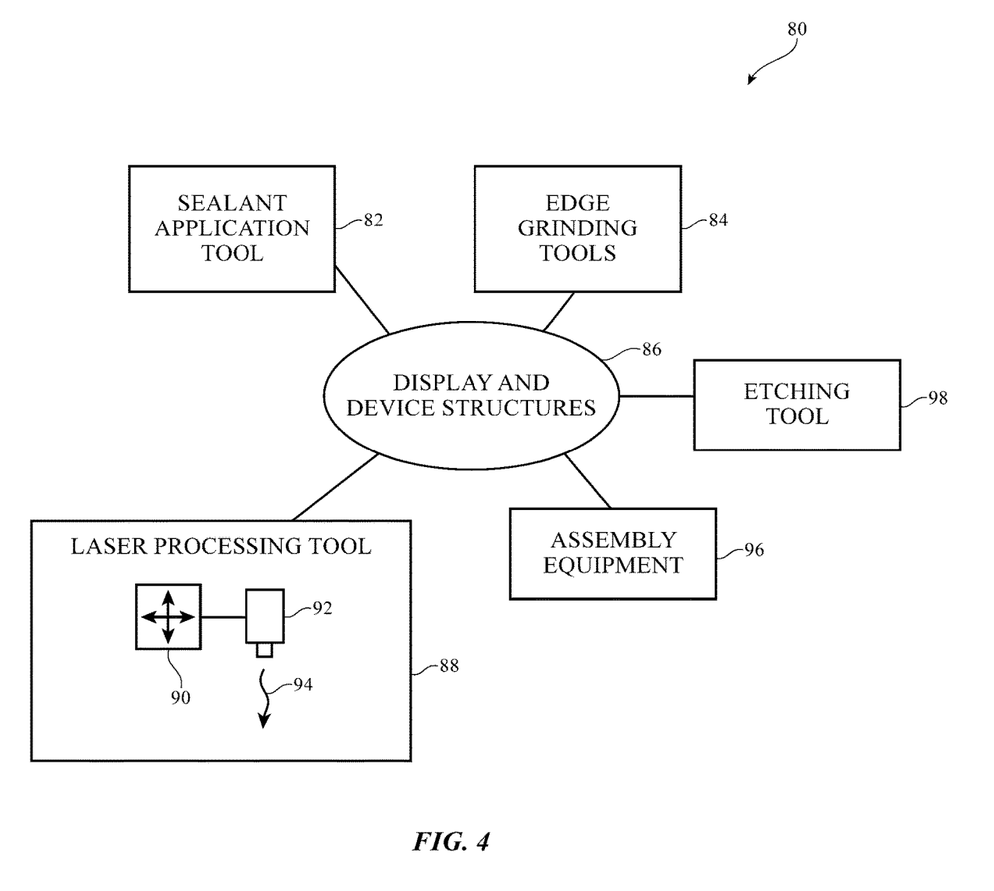
FIG. 4 is a diagram of an illustrative system including equipment for forming display and device structures in accordance with an embodiment.

Illustrative equipment for forming electronic devices that include displays such as displays 14 of FIGS. 2 and 3 and other displays is shown in FIG. 4. Equipment 80 may be used in processing display layers for display 14 and/or other components for forming device 10 (shown in FIG. 4 as display and device structures 86). Equipment 80 may be used in forming displays with laser-welded display layers such as glass substrate layers joined with glass welds or other welded display layers. The welded layers may include substrate layers formed from glass, sapphire or other crystalline materials, ceramic, plastic, or other material and may be transparent, opaque, flexible, and/or rigid. Configurations in which equipment 80 is used to perform laser welding on rigid layers of material such as transparent glass layers may sometimes be described herein as an example.

Display 14 may contain a liquid crystal layer such as layer 52. To retain layer 52 within display 14, a ring of sealant may be formed around the periphery of display 14 between layers 56 and 58. The sealant may be dispensed by sealant application tool 82. Tool 82 may contain a computer-controlled positioner that moves a needle dispenser or other structure that dispenses adhesive in liquid form. Tool 82 may, for example, dispense a rectangular ring of adhesive around the rectangular periphery of a rectangular display, may dispense a circular ring of adhesive around the circular peripheral edge of a circular display, may dispense adhesive that runs along the periphery of a display with other shapes, etc. The adhesive may be cured by application of ultraviolet light produced by tool 82 (e.g., when the dispensed sealant is a ultraviolet-light-cured liquid adhesive), may be cured by application of heat, may be a two-part adhesive that cures at room temperature, or may be a thermoplastic adhesive that solidifies upon cooling from a heated molten liquid state. Tool 82 may be based on any suitable sealant dispensing equipment (e.g., an ink-jet dispenser, screen printing equipment, etc.).

Edge grinding tool 84 may include a rotating grinding bit or other grinder and a computer-controlled positioner that moves the rotating grinding bit along the periphery of the display layers of display 14. The grinding bit may have a profile that grinds a desired shape into the edge of the layers of display 14. Grinding tool 84 may, for example, provide the exposed peripheral edge surface of the layers of display 14 with a beveled profile, a curved profile, a profile with surfaces that meet at right angles, or other desired profile.

Etching tool 98 may include a bath of liquid etchant (e.g., a glass etchant such as hydrofluoric acid). Tool 98 may also include equipment for dipping the edges of display 14 into the etchant or for otherwise applying etchant to the edge surfaces of the layers of display 14. Etching operations performed with tool 98 may remove a thin layer of the glass or other material in the layers of display 14. This removes microscopic cracks and other damage that might otherwise tend to weaken display 14 and therefore strengthens display 14.

Laser processing tool 88 may include a laser such as laser 92. Laser 92 may produce laser beam 94. Laser 92 may be, for example, an infrared laser, a visible light laser, or an ultraviolet light laser. Laser 92 may produce continuous wave output or pulsed output. The wavelength of laser light produced by laser 92 and the intensity of laser light produced by laser 92 are preferably selected so that exposed glass surfaces or other layers of display 14 are locally softened and/or melted sufficiently to form laser welds (e.g., glass welds in scenarios in which the display layers that are being welded together are formed from glass). Tool 88 may include computer-controlled positioning equipment such as computer-controlled positioner 90. Positioning equipment in tool 88 may move display layers in display 14 and/or laser 92. For example, positioner 90 may move laser 92 and/or layers in display 14 so that laser 92 travels along the periphery of display 14. As laser 92 moves along the edge of display 14, laser light 94 may weld edge portions of the layers in display 14 such as layers 56 and 58 to each other.

Following processing using equipment such as tools 82, 84, 98, and 88, assembly equipment 96 may be used to complete assembly of display 14 and to place display 14 and other electrical components in housing 12 to complete assembly of device 10. Assembly equipment 96 may include computer-controlled equipment and/or manually controlled equipment for placing components in housing 12.

Figure 5:
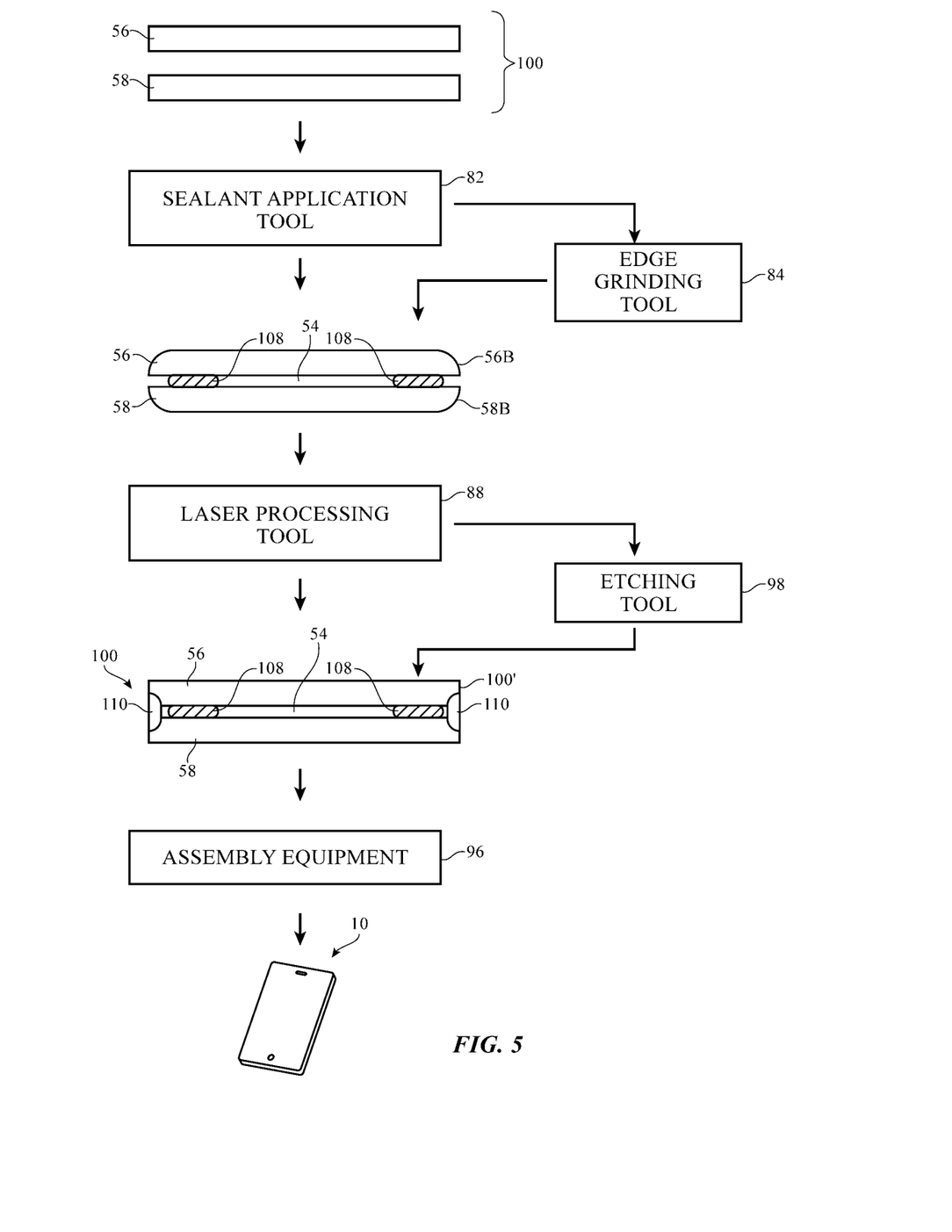
FIG. 5 is a diagram of equipment and operations involved in forming an electronic device having a display with laser-welded edges in accordance with an embodiment.

Illustrative equipment and operations for forming an electronic device having display layers that are welded together are shown in FIG. 5. As shown in FIG. 5, sealant application tool 82 may apply sealant 108 to display layers 100 such as layers 56 and 58. Sealant application tool 82 may apply sealant 108 along the peripheral edge of layers 100 (e.g., sealant 108 may run along the periphery of layers 100 and may surround a central region that contains a layer of liquid crystal material). If desired, edge grinding tool 84 may be used to grind the peripheral edge surface of layers 100. Tool 84 may, for example, have a grinding bit with a profile that forms a beveled or curved surface such as ground surface 56B in layer 56 and a profile that forms a beveled or curved surface such as ground surface 58B in layer 58. The ground edge surface of layers 100 may also have a straight vertical orientation that forms a right angle with the planar upper and lower surfaces of layers 100 (as an example). Layers 100 may have a planar shape, may have a convex or concave profile, may have edges that are bent out-of-plane relative to a central planar region, or may have other suitable profiles. The footprint of layers 100 (i.e., the shape of layers 100 when viewed in direction 48 of FIG. 2) may be round, oval, rectangular, or may have other suitable shapes.

Following application of sealant 108 to layers 100 to attach layers 100 together and seal liquid crystal material within display 14 and following optional edge shaping operations with an edge shaping tool such as edge grinding tool 84, laser processing tool 88 may be used to weld layers 100 together. As shown in FIG. 5, for example, laser processing tool 88 may apply a beam of laser light to the peripheral edge surface of layers 100 thereby forming a peripheral weld such as weld 110. Weld 110 may be a portion of molten glass or other material from layers 56 and 58 that runs along the periphery of display 14 and that helps attach layers 56 and 58 together. Welded regions in layers 100 such as weld 110 may help strengthen the bond between layers 56 and 58 that is formed by sealant 108 and may protect sealant 108 and the liquid crystal layer between layers 56 and 58 from intrusion of liquid and other materials. As shown in FIG. 5, etching tool 98 may optionally be used to etch edge surfaces 100' of layers 100 following laser welding and/or edge grinding.

Assembly equipment 96 may be used to complete the assembly of display 14 and may be used to assemble display 14 and other electrical components into housing 12 to form a completed electronic device (e.g., device 10 of FIG. 5).

Figure 6:
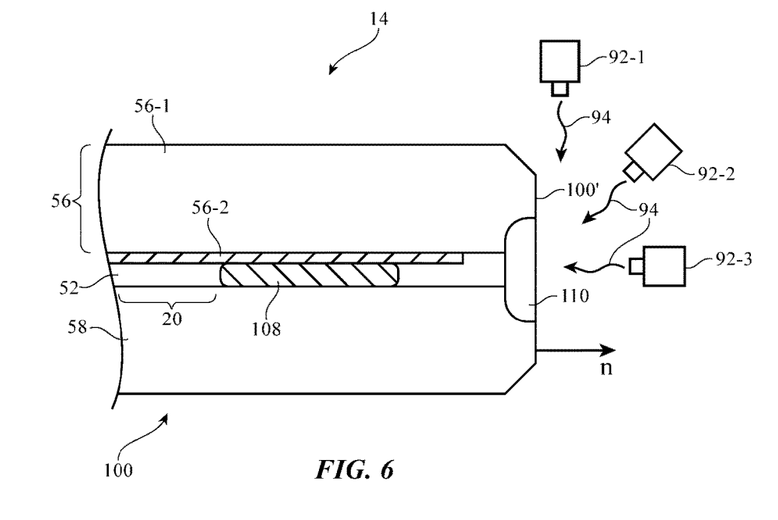
FIG. 6 is a cross-sectional side view of an illustrative display having layers that are being laser welded in accordance with an embodiment.

FIG. 6 is a cross-sectional side view of edge surface 100' of layers 100 during laser welding. Layers 100 may include layers such as layers 56 and 58. Sealant 108 may be used to attach layers 56 and 58 together and may surround liquid crystal layer 52 and pixels 20 that are formed from layer 52 and associated color filter elements, thin-film transistors, electrodes, and other structures on layers 100. Layers 100 may include thin layers of material (see, e.g., layer 56-2 on substrate 56-1 in layer 56) that may not adhere well to sealant 108 when layers 100 are subjected to a drop event or other source of stress. By laser-welding layers 100 together (e.g., by forming welded region 110 around some or all of the periphery of display 14), the strength of display 14 may be enhanced.

As shown in FIG. 6, laser 92 may be placed in positions such as position 92-1, 92-2, and 92-3 when applying laser beam 94 to peripheral edge surface 100' of layers 100. When laser 92 is in position 92-1, the longitudinal axis of beam 94 will extend vertically (perpendicular to surface normal n of surface 100'). When laser 92 is in position 92-2, beam 94 will be oriented at a 45° angle or other non-zero angle with respect to surface normal n (e.g., an angle of 0-90°). When laser 92 is in position 94-3, beam 94 will be oriented parallel to the planes of layers 56 and 58 and parallel to surface normal n of edge surface 100. In general, laser 92 may have any suitable orientation relative to layers 100 and beam 94 may be applied to edge surface 100' of layers 100 at any suitable angle with respect to surface normal n of edge surface 100'. Sufficient energy is absorbed from beam 94 to melt portions of layers 56 and/or 58 (and, if desired, portions of a glass frit layer, a glass gasket, or other glass material between the glass of layers 56 and 58) and thereby form a welded region such as weld 110. Weld 110 may be a glass weld or, when layers 56 and 58 are formed from other materials, weld 110 may be formed from portions of these other materials.

Figure 7:
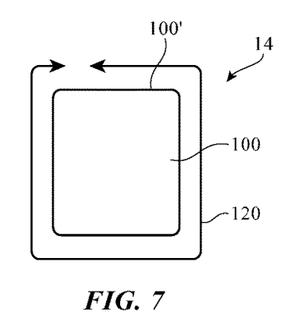
FIG. 7 is a top view of an illustrative display in which a laser welding tool has formed a weld such as a glass weld around the periphery of the display in accordance with an embodiment.

As shown in FIG. 7, laser 92 may be moved around the entire periphery of layers 100 along peripheral path 120, thereby creating a weld 110 that extends around the entire periphery of layers 100 (i.e., all of peripheral edge surface 100'). If desired, laser welding may be applied to a subset of the peripheral edge of layers 100. For example, laser welding may be applied only to the corners of layers 100.

Figure 8:
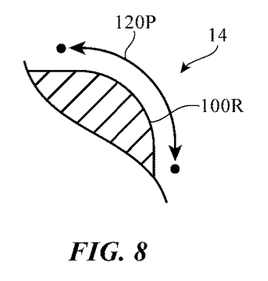
FIG. 8 is a top view of a rounded corner portion of an illustrative display with a corner laser weld in accordance with an embodiment.
Figure 9:
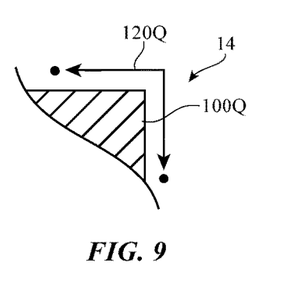
FIG. 9 is a top view of a corner portion of an illustrative rectangular display that has straight sides meeting at right angles and that has a corner weld in accordance with an embodiment.

FIG. 8 shows how a laser welds may be formed along corners portions 120P of edge surface 100' at rounded corners 100R of layers 100 (e.g., on each of the four rounded corners of a rectangular display). FIG. 9 shows how laser welds may be formed along corner segments 120Q of edge surface 100' along square corners 100Q of layers 100 (e.g., on each of the four corners of a rectangular display where the sides of the display meet at right angles). The laser weld segments of FIGS. 8 and 9 may cover only the corners of display 14 and not the straight sides of display 14 that extend between the corners.

Figure 10:
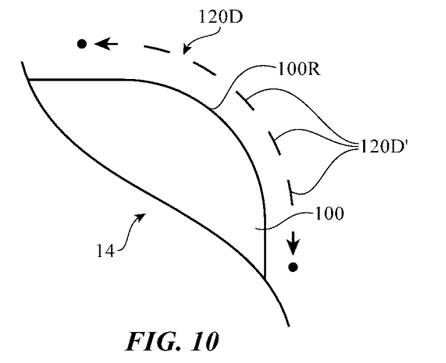
FIG. 10 is a top view of a corner portion of an illustrative display with rounded corners that has been laser welded using bursts of laser light to create disjoint weld segments in accordance with an embodiment.

As shown in FIG. 10, laser weld 110 may be formed by moving laser 92 along path 120D while pulsing laser beam 94. This results in a pattern for laser weld 110 with multiple disjoint segments each of which corresponds to a respective one of path segments 120D' of path 120D. If desired, a segmented laser weld (i.e., a configuration for weld 110 in which weld 110 has multiple disjoint segments running along the peripheral edge of layers 100) may extend around the entire periphery of display 14. The configuration of FIG. 10 in which segmented laser weld 110 extends only around each corner 100R of layers 100 is merely illustrative.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a first glass layer having a lower surface and a first peripheral edge surface that extends from the lower surface at a non-zero angle;
a second glass layer having an upper surface and a second peripheral edge surface that extends from the upper surface at a non-zero angle;
an array of organic light-emitting diode pixels interposed between the upper surface and the lower surface;
a glass material that is distinct from the first glass layer and the second glass layer; and
a weld including at least a portion of each of the first glass layer, the second glass layer, and the glass material and that joins the first glass layer directly to the second glass layer and forms the first and second peripheral edge surfaces.

2. The electronic device defined in claim 1, wherein the weld is formed from first and second disjoint segments and wherein the first and second disjoint segments each include a portion of each of the first peripheral edge surface and the second peripheral edge surface.

3. The electronic device defined in claim 2, wherein the first and second disjoint segments are separated from each other by a gap at a corner of the first and second glass layers.

4. An electronic device, comprising:
a first transparent layer having a lower surface and a first edge surface that extends from the lower surface at a non-zero angle;

a second transparent layer having an upper surface and a second edge surface that extends from the upper surface at a non-zero angle;

an array of organic light-emitting diode pixels interposed between the upper surface and the lower surface; and a weld comprising portions of the first transparent layer, the second transparent layer, and a third layer that is distinct from the first and second transparent layers, wherein the weld forms a portion of each of the first and second edge surfaces and wherein the weld is formed from first and second segments.

5. The electronic device defined in claim 4, wherein the weld is formed only on corners of the first transparent layer and the second transparent layer.

6. An electronic device having a periphery with an edge surface, comprising:

display circuitry;

a first glass layer having a first surface facing the display circuitry;

a second glass layer having a second surface facing the display circuitry; and a glass material that is distinct from the first glass layer and the second glass layer, wherein the glass material is interposed between the first glass layer and the second glass layer to form at least a portion of a glass weld directly on the edge surface, wherein the glass weld extends around at least part of the periphery and joins the first glass layer to the second glass layer, and wherein the glass weld comprises at least a portion of each of the first glass layer, the second glass layer, and the glass material.

7. The electronic device defined in claim 6, wherein the display circuitry comprises thin-film transistor circuitry.

8. The electronic device defined in claim 7, wherein the thin-film transistor circuitry comprises thin-film organic light-emitting diodes.

9. The electronic device defined in claim 6, wherein the glass weld comprises first and second individual portions that are separated by a gap, wherein the first and second individual portions each comprise at least a portion of each of the first glass layer, the second glass layer, and the glass material.

* * * * *